United States Patent
Bates et al.

(10) Patent No.: US 6,865,713 B1
(45) Date of Patent: Mar. 8, 2005

(54) APPARATUS, PROGRAM PRODUCT AND METHOD OF ANNOTATING A HYPERTEXT DOCUMENT WITH COMMENTS

(75) Inventors: Cary Lee Bates, Rochester, MN (US); Paul Reuben Day, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 09/131,063

(22) Filed: Aug. 7, 1998

(51) Int. Cl.[7] .................................................. G06F 7/00
(52) U.S. Cl. ........................................ 715/512; 715/513
(58) Field of Search ............................. 707/501, 512, 707/513

(56) References Cited

U.S. PATENT DOCUMENTS

| | | | | |
|---|---|---|---|---|
| 5,280,574 A | * | 1/1994 | Mizuta et al. | 707/511 |
| 5,806,079 A | * | 9/1998 | Rivette et al. | 707/512 |
| 5,931,907 A | * | 8/1999 | Davies et al. | 709/218 |
| 5,937,417 A | * | 8/1999 | Nielsen | 707/513 |
| 5,978,767 A | * | 11/1999 | Chriest et al. | 705/1 |
| 6,014,134 A | * | 1/2000 | Bell et al. | 345/329 |
| 6,014,677 A | * | 1/2000 | Hayashi et al. | 707/501 |
| 6,075,537 A | * | 6/2000 | Adapathya et al. | 345/357 |
| 6,092,081 A | * | 7/2000 | Alpert et al. | 707/104 |
| 6,199,080 B1 | * | 3/2001 | Nielsen | 707/513 |
| 6,230,169 B1 | * | 5/2001 | Nagae | 707/512 |
| 6,230,170 B1 | * | 5/2001 | Zellweger et al. | 707/512 |

OTHER PUBLICATIONS

"Hot Off The Web" product literature, http://www.hotofftheweb.com/details.html, downloaded Jul. 6, 1998. P 1–4.
Homer, et al., *Instant HTML*, Wrox Press Ltd., (2nd ed., 1997), Chapter 5, pp. 85–107.

* cited by examiner

*Primary Examiner*—C B Paula
(74) *Attorney, Agent, or Firm*—Wood, Herron & Evans, LLP

(57) ABSTRACT

An apparatus, program product, and method support the annotation of a hypertext document with one or more comments to supply additional information to a user about that document and/or about other documents linked to that document. With the latter type of comments, such comments are displayed to a user prior to the user attempting to retrieve any hypertext document associated with such comments, so that the user can make a more informed decision prior to retrieving the hypertext document. Thus, for example, if a comment for a given hypertext document indicates that the document would not be particularly useful, the user may decide to not retrieve the document, and thus save the time otherwise associated with retrieving and viewing the document.

41 Claims, 7 Drawing Sheets

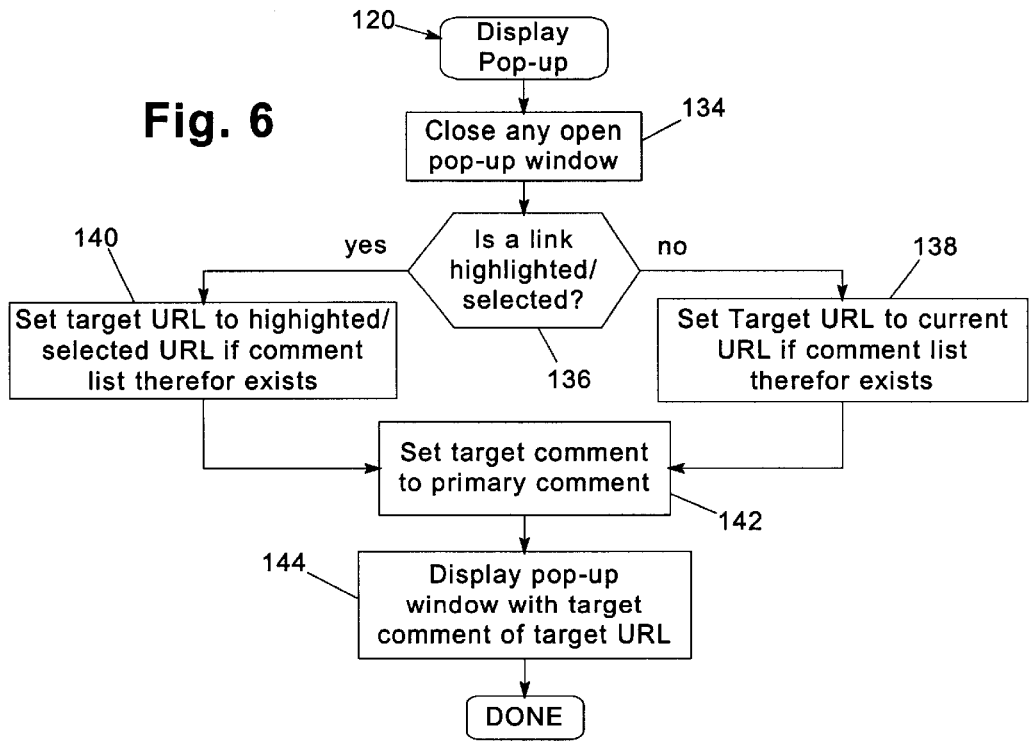
Fig. 6
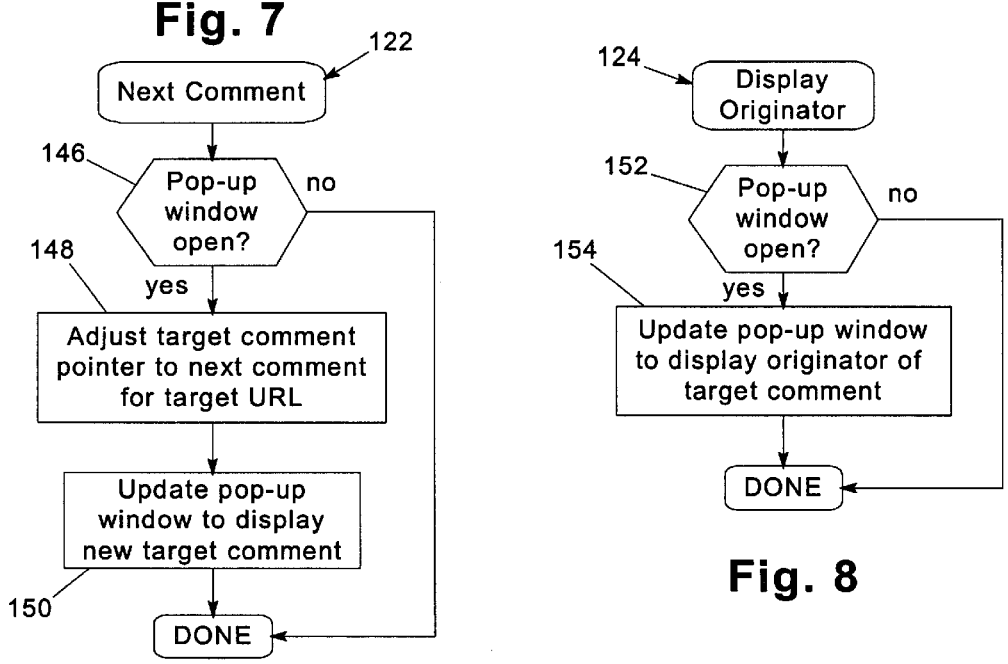
Fig. 7
Fig. 8

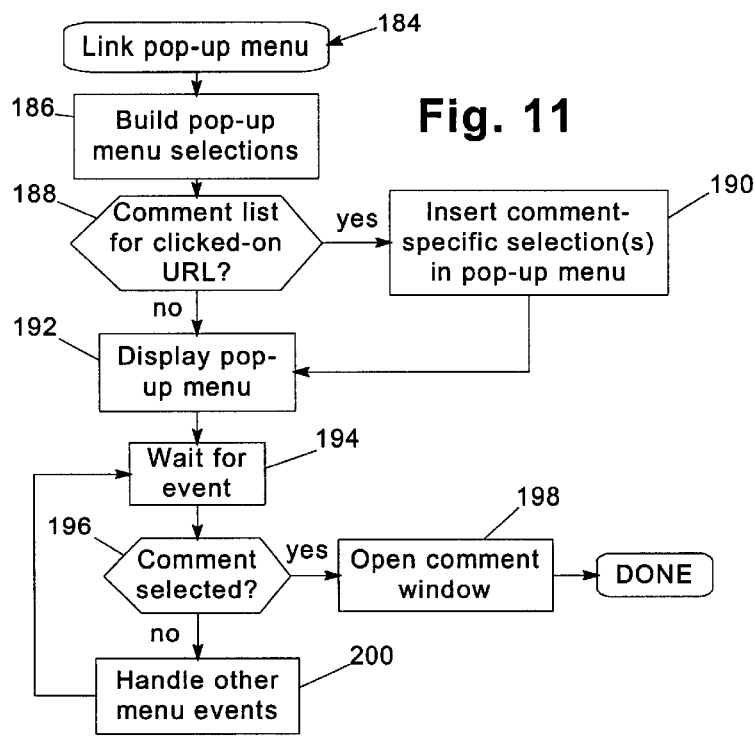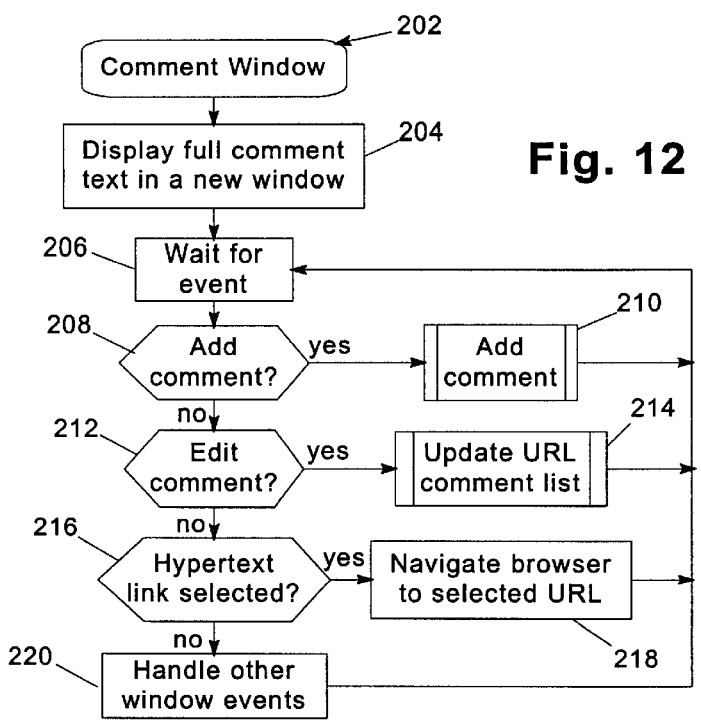

APPARATUS, PROGRAM PRODUCT AND METHOD OF ANNOTATING A HYPERTEXT DOCUMENT WITH COMMENTS

FIELD OF THE INVENTION

The invention is generally related to computers and computer software. More specifically, the invention is generally related to the display of hypertext documents with browser computer programs and the like.

BACKGROUND OF THE INVENTION

The amount and variety of information that can be accessed through a computer continues to increase at an astounding rate. The Internet, in particular, has enabled computer users to access a wide variety of information from other computers located all over the world.

Much of the information accessible via the Internet is organized into hypertext documents, which are typically documents formatted in a language known as Hypertext Markup Language (HTML), and which are accessed via a segment of the Internet known as the World Wide Web. Hypertext documents typically include one or more embedded "hypertext links" that an end user can select to either jump to different documents, or to jump to different locations within the same document. Each hypertext document typically is identified by the storage location (known as a Uniform Resource Locator (URL)) at which the document is stored, with a hypertext link to a particular document specifying the storage location of that document so that, upon selection of the link, that document may be retrieved.

A wide variety of other information such as text, graphics, video, sound, and animation may be integrated into hypertext documents, and moreover, these documents can be organized into "sites", typically maintained by a single entity, that collect multiple related documents together in a coherent fashion. Furthermore, due to the immense popularity of the World Wide Web, many private computer networks now also support hypertext documents, as do a number of existing computer operating systems and computer software applications.

A computer program, often referred to as a browser, is typically used to navigate between and through hypertext documents. With a browser, an end user can use a mouse or other pointing device to point and click on links such as highlighted text, images or other user interface components (e.g., buttons) in documents to navigate to different documents and/or to different locations within the same document.

While the point and click interface used to navigate between hypertext documents is exceptionally simple to learn and use, a user typically has little guidance as to where he or she has been, and where he or she should go next. Due to the vast amount of information available on the Internet, it is relatively easy for a user to lose his or her place, or to forget where he or she has previously visited. Also, increases in the amount of available information about a particular topic often results in proportional increases in the amount of useless information about that topic. As a result, it becomes more and more difficult to successfully "separate the wheat from the chaff" and locate useful information on the Internet.

Furthermore, due to excessive traffic on the Internet, as well as to the relatively slow analog phone connections that many users must use to connect to the Internet, a significant amount of time is often spent waiting for hypertext documents to be retrieved from the Internet. Often, while a user waits for a hypertext document to be retrieved, the user cannot view and digest all the information in the hypertext document until document retrieval is complete. As such, the user is often much less productive during document retrieval. Moreover, if it is found out after retrieving a particular hypertext document that the document contains little if any useful information, the user's productivity further drops because the user must often backtrack and look elsewhere for the desired information. This is often a significant source of frustration among many users.

For these reasons, it is desirable to minimize whenever possible the retrieval of useless hypertext documents. However, often the only way of finding out whether a particular hypertext document is useful is to retrieve the document and view its contents. Furthermore, a user must often make a mental note to remind himself or herself that a particular hypertext document is or is not useful. However, if a user forgets that a particular document that he or she has viewed is not useful, the user may needlessly waste time returning to that useless document on a later date.

Many browsers support the use of "bookmarks" (also known as "favorites"), through which a user can maintain a list of favorite sites or documents that a user expects to view in the future. In addition, many browsers support description fields in bookmarks within which a user can store additional text about the bookmarks. Useless hypertext documents, on the other hand, are typically omitted from such lists so that only useful documents are identified. Consequently, a user often cannot rely on lists of bookmarks to determine whether documents are or are not useful.

Many browsers also provide rudimentary indications of whether or not a particular hypertext document has been viewed before. Typically, this is performed by changing the color of a hypertext link to a particular document whenever that document is stored locally on a user's computer by virtue of it having been recently viewed. However, no indication as to any of the contents of a particular document is provided by such. Moreover, many browsers routinely delete unused locally-stored documents from time to time, and thus, a user is typically unable to reliably know whether or not a particular hypertext document has been before.

Many users would likely find it helpful to be able to determine additional information about a particular hypertext document prior to actually retrieving the document, so that the user could potentially decide not to retrieve a potentially useless document. A hypertext link, which can be associated with a text and/or image display representation, can contain some information about the particular document referenced by the link. Moreover, some browsers display a pop-up, or "bubble" window over a display representation of a hypertext link whenever a mouse pointer is moved over the display representation. The bubble window may display, for example, the URL of the hypertext document referenced by the link.

Alternatively, the pop-up window may display an alternate message supplied by the author of the document (e.g., by specifying the message in an "ALT" field in the definition for the hypertext link, which is principally used to display an alternative text message whenever a particular browser is not set up to display images). In this instance, however, the message is directly stored in the hypertext document by the document's author, so the message is likely self-serving to an extent since the author typically wants as many users as possible to take the link. Moreover, the same message will be displayed regardless of when the user views the document, so the user that has previously viewed a document is still likely to later forget whether the document is particularly useful. As a result, conventional uses of pop-up windows do little to assist a user in determining whether the user should retrieve a document of unknown usefulness.

Therefore, a significant need continues to exist for a manner of reducing the amount of wasted time associated with retrieving and viewing hypertext documents. Specifically, a significant need has arisen for an improved manner of supplementing a user's knowledge about a particular hypertext document so that the user can make a more informed determination as to whether that document should be retrieved.

SUMMARY OF THE INVENTION

The invention addresses these and other problems associated with the prior art by providing an apparatus, program product, and method that support the annotation of a hypertext document with one or more comments to supply additional information to a user about that document and/or about other documents linked to that document. With the latter type of comments, such comments are typically displayed to a user prior to the user attempting to retrieve any hypertext document associated with such comments, so that the user can make a more informed decision prior to retrieving the hypertext document. Among other advantages that will become more apparent below, if a comment for a given hypertext document indicates that the document would not be particularly useful, the user may decide to not retrieve the document, and thus save the time otherwise associated with retrieving and viewing the document.

A wide variety of unique features may be supported in connection with the use of comments consistent with the invention. It should be appreciated that each of these features may be utilized either in cooperation with, or independent of, other features described herein.

Comments may be stored in a comment data structure, with each comment associated with a given hypertext document. Therefore, consistent with one aspect of the invention, when at least a portion of a particular hypertext document is displayed on a computer display, the comment data structure is accessed to locate a predetermined comment in the comment data structure that is associated with that particular hypertext document. A display representation of that predetermined comment is then displayed on the computer display.

Comments may also be obtained from a variety of sources consistent with the invention. For example, comments may be created by the user, thus functioning as reminders for the user about particular documents that the user has viewed before. Thus, as an example, if a user views a document that is not particularly useful, the user can create a comment such as "don't bother going here", so that the next time the user has the opportunity to view the document, the user will not needlessly do so.

Therefore, consistent with another aspect of the invention, a hypertext document may be annotated by creating a comment associated with a predetermined storage location in response to user input, displaying at least a portion of the hypertext document on a computer display, with the portion of the hypertext document including a display representation of a hypertext link definition that references the predetermined storage location, and displaying a display representation of the comment in response to user input directed to the hypertext link definition. The predetermined storage location may identify the hypertext document itself, or may identify another hypertext document that is referenced by that document, e.g., via a hypertext link. While other predetermined storage location formats may also be used consistent with the invention, one suitable format for a predetermined storage location is a Uniform Resource Locator (URL).

Comments for a particular user may also be created by others, and shared with the user so that the user can rely on the experiences of others to determine the relative worth of previously unexplored documents. Furthermore, it may also be desirable to permit an author of a particular document to supply comments for display to users that view the document.

In this latter instance, comments may be supplied by an author by embedding the comments within the tags defined within the hypertext document itself. Furthermore, multiple comments may be supplied within a given tag so that a comment data structure may be constructed therefrom. Therefore, consistent with another aspect of the invention, a hypertext document may be generated by authoring a hypertext document and embedding within that document at least one comment data tag. The comment data tag includes comment data that defines a plurality of comments, with each comment associated with a predetermined storage location.

Furthermore, consistent with yet another aspect of the invention, a data structure may be built to include a plurality of comments, with each comment associated with a predetermined storage location. To build the data structure, a hypertext document may be retrieved, and, in response to retrieval of a comment data tag embedded in the hypertext document, a comment may be added to the data structure using information in the comment data tag.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

BRIEF DESCRIPTION OF THE DRAWINGS

FIG. 6 is a flowchart illustrating the program flow of the display pop-up routine of FIG. 5.

FIG. 7 is a flowchart illustrating the program flow of the next comment routine of FIG. 5.

FIG. 8 is a flowchart illustrating the program flow of the display originator routine of FIG. 5.

FIG. 11 is a flowchart illustrating the program flow of the link pop-up menu component of FIG. 2.

FIG. 12 is a flowchart illustrating the program flow of the comment window component of FIG. 2.

DETAILED DESCRIPTION

Figure 1:
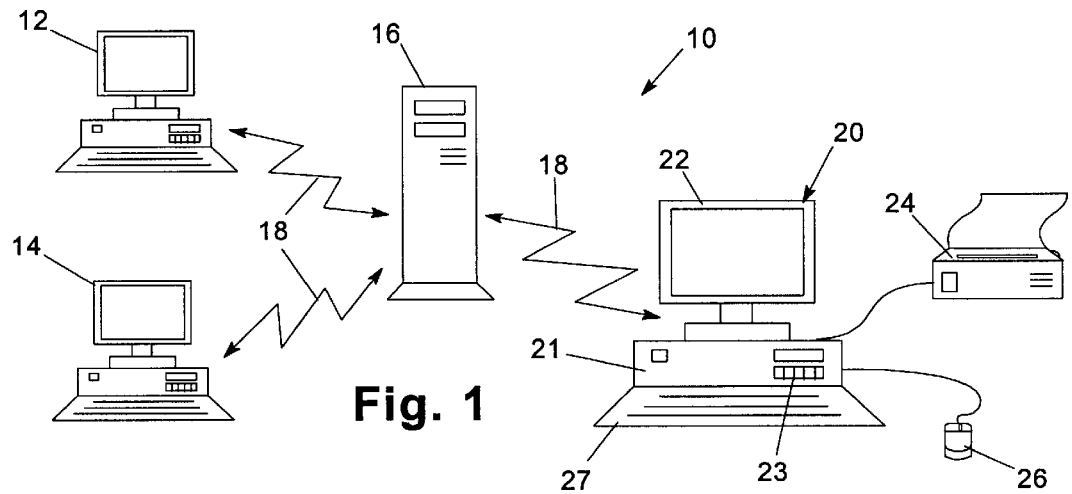
FIG. 1 is a block diagram of a networked computer system consistent with the invention.

Hardware and Software Environment Turning to the Drawings, wherein like numbers denote like parts throughout the several views, FIG. 1 illustrates a computer system 10 consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured, albeit typically with greater processing performance and storage capacity, as is well known in the art.

Figure 2:
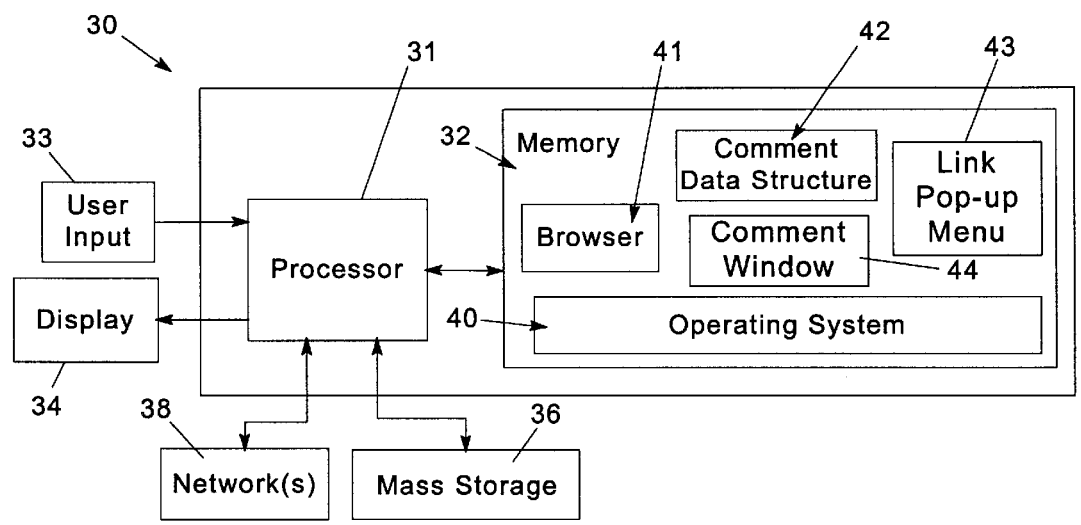
FIG. 2 is a block diagram of an exemplary hardware and software environment for a computer from the networked computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer (e.g., similar to computers 12, 14 and 20 of FIG. 1), a server computer (e.g., similar to server 16 of FIG. 1), a portable computer, an embedded controller, etc. Apparatus 30 may be coupled in a network as shown in FIG. 1, or may be a stand-alone device in the alternative. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). It should be appreciated, however, that with some implementations of computer 30, e.g., some server implementations, direct user input and output may not be supported by the computer.

For additional storage, computer 30 may also include one or more mass storage devices 36, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38 as is well known in the art.

Computer 30 operates under the control of an operating system 40, and executes or otherwise relies upon various computer software applications, components, programs, objects, modules, data structures, etc. (e.g., browser 41, comment data structure 42, link pop-up menu component 43, and comment window component 44, among others). Moreover, various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Annotation of Hypertext Documents

As discussed above, exemplary embodiments of the invention generally utilize a comment data structure to maintain a record of one or more comments associated with predetermined hypertext documents such that, as those hypertext documents are displayed, comments associated therewith may also be displayed to annotate the documents.

A comment is typically associated with a hypertext document using a storage location identifier for the comment that identifies a predetermined storage location associated with the hypertext document. For the purposes of the invention, the predetermined storage location for a hypertext document may be the storage location that identifies from where the document may be retrieved and stored. A predetermined storage location associated with a particular document may also, however, include the storage location of any other hypertext document that is referenced by that document, e.g., via a hypertext link.

In the illustrated embodiments, hypertext documents are retrievable via a uniform resource locator (URL), which is well known for use in the retrieval of hypertext documents stored on the Internet and the like. Furthermore, the hypertext documents are typically provided in a format such as Hypertext Markup Language (HTML) and are stored remotely from a user's local computer, e.g., via the Internet or another public or private network. However, it should be appreciated that the invention may also be utilized in other applications, with hypertext documents identified by alternate storage identifiers and/or stored in alternate formats. Moreover, it should be appreciated that the principles of the invention may be utilized in connection with the retrieval of hypertext documents located in a user's local computer as well or in lieu of documents stored remote therefrom.

A comment data structure is typically utilized to maintain a plurality of comments for use by a user in annotating hypertext documents. A comment data structure is typically stored local to a user's computer so that the collection of comments in the data structure are unique to the user. However, as will become more apparent below, a comment data structure may also be stored remote from a user's computer, e.g., to permit comments to be shared by several users.

Figure 3:
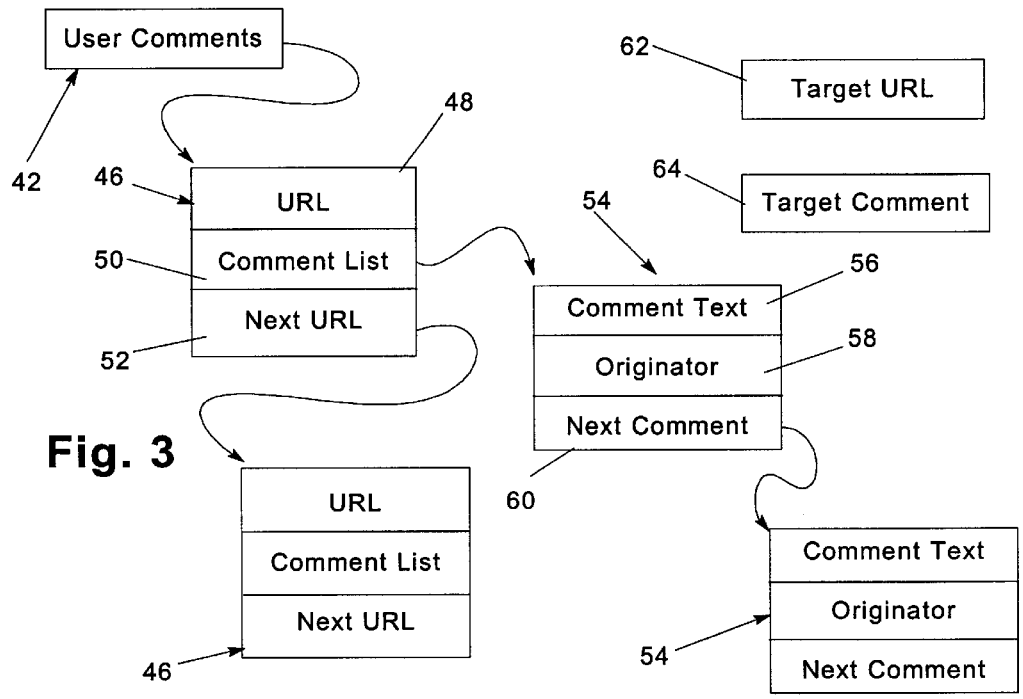
FIG. 3 is a block diagram of the comment data structure of FIG. 2.

One suitable implementation of a comment data structure 42 is illustrated in greater detail in FIG. 3. Comment data structure 42 is implemented as a linked list including a plurality of URL specific comment lists 46. For each comment list 46, a storage location identifier is provided at 48 that identifies a storage location with which a particular comment list is associated. A pair of pointers, 50, 52 are also provided for each comment list 46. Pointer 50 points to a linked list of comments 54, while pointer 52 points to the next comment list in the comment data structure. It should be appreciated that the last comment list 46 will typically include a "null" value for pointer 52.

Each comment 54 in each comment list 48 typically includes comment text 56 that is the comment information to be displayed to a user when annotating a hypertext document. Comment text 56 may include any type of displayable information, including but not limited to text data, image data, audio data and/or video data, among others. Comment text 56 may be as basic as a string of characters, or may include multimedia capabilities, as desired. Furthermore, as described in greater detail below, comment text 56 may also include executable data, or pointers thereto, e.g., to provide a hypertext link to another hypertext document. While a wide variety of formats may be utilized for comment text 56, one suitable format may be HTML-compatible data, whereby a well-known and recognized interface format for displaying the comment would be provided thereby. It should be appreciated, however, that a wide variety of types of information and data formats may be utilized to implement comment text 56 consistent with the invention.

Each comment 54 may also include an originator field 58, which is used to identify the originator or author of that particular comment. In some implementations, field 58 may be omitted; however, by providing such a field, additional functionality is supported when comments are shared between multiple users, so that a user can recognize the author of a particular comment among many associated with a given document.

Each comment 54 also includes a next comment pointer 60 that points to a next comment 54 in the comment list associated with the URL. It should be appreciated that the last comment in such a list typically includes a "null" value for pointer 60 to indicate the end of the list.

Each comment may include additional information, e.g., date and time of creation, a priority number, etc. Other modifications will be apparent to one of ordinary skill in the art.

As will become more apparent below, additional pointers may be utilized to locate particular comments within comment data structure 42. For example, a target URL pointer 62 may be utilized to identify a particular comment list 48 among those in comment data structure 42. Similarly, a target comment pointer 64 may be used to identify a particular comment 54 among those in the comment list 48 identified by pointer 62. The configuration and use of pointers 62 and 64 will become more apparent below.

Figure 4:
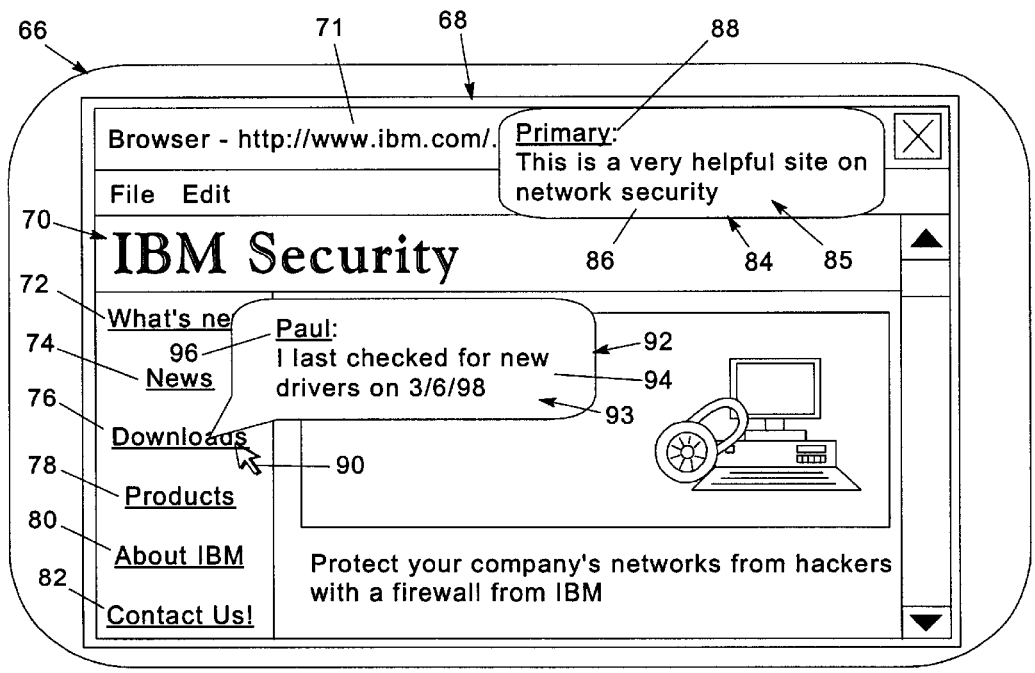
FIG. 4 is a block diagram of a computer display illustrating a display representation of a hypertext document by the browser of FIG. 2.

To illustrate a number of operations and features that may be implemented utilizing comment data structure 42, FIG. 4 illustrates a computer display 66 upon which is displayed a window 68 for a conventional browser computer program (e.g., browser 41 of FIG. 2). Displayed within window 68 is a display representation of a hypertext document 70. Document 70 is accessed via a storage location (URL) identified in window 68 at 71. Document 70 also includes a plurality of hypertext links 72, 74, 76, 78, 80 and 82, as well as additional text and image data displayed elsewhere in the window.

Comments consistent with the invention are typically displayed in two circumstances. First, a comment associated with the document being viewed in a browser may be displayed concurrently with the display of that document. As an example of this type of comment, FIG. 4 illustrates a window 84 within which is displayed a display representation of a comment 85 having a storage location identifier matching storage location 71 of hypertext document 70. Window 84 also displays a display representation of comment text 86 and a display representation of an originator 88 for comment 85. For example, the term "primary" may be used to designate a primary comment created by the viewer of the document, i.e., the local user.

A second situation in which a comment may be displayed occurs in conjunction with the display of a hypertext link that references a particular hypertext document. Typically, the display of such a comment occurs in response to user input directed to that hypertext link, e.g., via movement of a pointer 90 over a display representation of a link. This is illustrated, for example, for a comment associated with hypertext link 76 of hypertext document 70, where a pop-up window 92 is displayed in response to movement of pointer 90 over the display representation of hypertext link 76. Within window 92 is displayed a display representation of a comment 93, having comment text 94 and originator 96. In this instance, comment 93 has a storage location identifier that matches that of the target of hypertext link 76.

It will be appreciated that a wide variety of display options may be utilized in connection with the display of comments in the manner described herein. For example, comments associated with the documents that are the targets of a displayed hypertext link may be displayed in response to other user input, e.g., in response to the user depressing a key while the pointer is disposed over the link, in response to the user depressing a mouse button while the pointer is disposed over the link, etc. Moreover, such comments may be displayed continuously in different circumstances. Moreover, for any comment associated with the hypertext document being displayed, the display of such comments may be controlled via user input as well, or may be continuously displayed as illustrated in FIG. 4.

In addition, other pop-up window configurations may be utilized to display a comment consistent with the invention. The windows illustrated in FIG. 4 are examples "bubble" windows utilized in a number of conventional applications. However, other configurations may be utilized in the alternative, and thus, the invention should not be limited to the use with "bubble" windows. Other modifications will become more apparent from the discussion below.

As will become apparent below, it may be desirable to limit the display of comments to one comment at a time (inclusive or not-inclusive of the comment displayed for the current document). Thus, it is anticipated, for example, that the current document's comment would be displayed whenever the pointer is not hovering over a link with which a comment is associated. Whenever such a link was hovered over, the comment therefor would be displayed, with the comment for the current document either hidden or still displayed as desired. Other display alternatives will be apparent from the discussion below.

Figure 5:
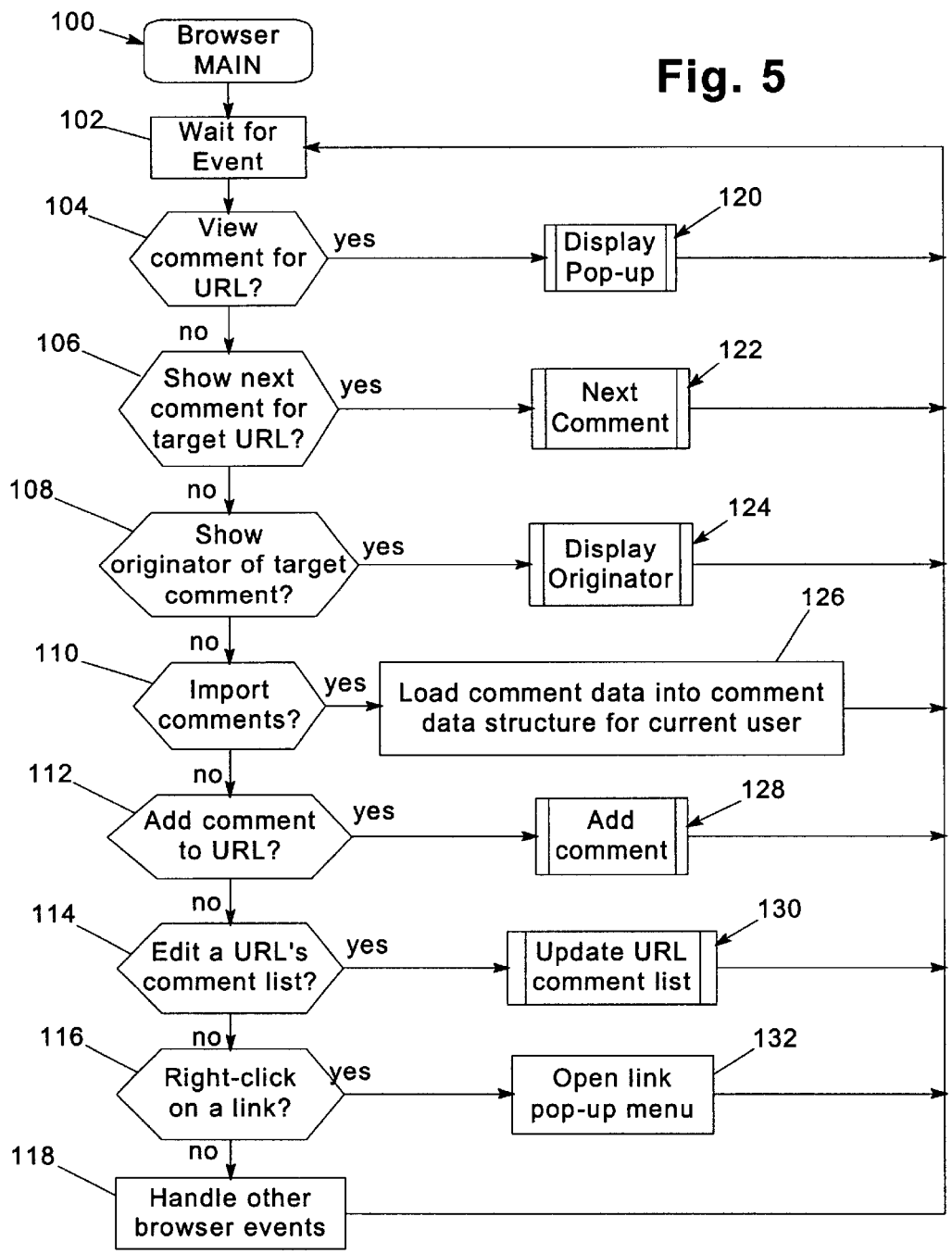
FIG. 5 is a flowchart illustrating the program flow of a main routine for the browser of FIG. 2.

FIG. 5 next illustrates a main routine 100 for browser for browser 41, which utilizes the aforementioned comment data structure to provide the above-described functionality. Routine 100 is illustrated as an event-driven system, whereby the routine waits at block 102 to receive an event, and upon receipt of such an event, attempts to handle the event in a predetermined manner. Upon completion of handling of any event, control returns to block 102 to process additional events.

Several events relevant to an understanding of the invention are detected, for example, in blocks 104–116, each of which is described in greater detail below. It should be appreciated, however, that a wide variety of additional events may be handled by routine 100, as illustrated at block 118. These additional events, which include functions such as retrieving hypertext documents, processing user input directed to various buttons and other controls on the browser, etc., are well known in the art, and thus need not be discussed in greater detail herein.

One event that may be handled by routine 100 is that of viewing a comment for a particular URL, which is detected at block 104 and handled by a display pop-up routine 120. This event may be initiated, for example, in response to user input directed to a particular hypertext link, e.g., in response to the user moving a mouse pointer over the display representation of the link (a feature also known as "hovering"). Typically, an event will be generated whenever the pointer moves onto, or off of, a display representation of a link. The event may be initiated in other manners, e.g., in response to a user request to display any comment associated with the current hypertext document being displayed. Other manners of initiating the event will be apparent to one of ordinary skill in the art.

Another event that may be handled by routine 100 is that of showing the next comment for a target URL, which is detected at block 106 and handled by a next comment routine 122. In the illustrated implementation, for example, each pop-up window typically displays only one comment for a given URL at a time. Thus, it may be desirable to toggle between various available comments for display to the user. Initiation of this event may occur in a number of manners, e.g., in response to selection of a toolbar button, a pop-up menu selection associated with the link, a keystroke and/or mouse button combination, etc. It should also be appreciated that a similar event may detected to select a previous comment or to go to any given comment amongst a plurality of comments associated with a given URL.

Yet another event that may be handled by routine 100 is that of showing the originator of a target comment, which is detected at block 108 and handled by a display originator routine 124. For example, it may be desirable to selectively hide or display the originator of a given comment. In many instances, the originator of a given comment may not be useful information for a user, whereby real estate on the display may be saved by hiding the originator. In other applications, however, it may be desirable to know the originator of a given comment at any given time, as the originator may indicate the relative worth of a particular comment. This event may be initiated in a number of manners, e.g., depressing a control or shift key while the pop-up window for a given comment is displayed, or via user-configurable option in the browser, among others. It should also be appreciated that the originator information may be omitted, or may be continuously displayed to a user, whereby such an event would be unnecessary.

Another event that may be handled by routine 100 is that of importing comments, which is detected at block 110 and handled in block 126 by loading comment data into the comment data structure for the current user. This type of event may be initiated, for example, in response to an "import comments" menu selection in the browser, among other manners. It may be desirable, for example, for users to be permitted to share their comments about particular documents so that a user may rely on the comments of other users to determine the relative worth of a particular hypertext document. It is anticipated that a user could retrieve a unique comment file generated by another user, e.g., over the Internet or via a removable storage device. This would also permit, for example, a user to store multiple comment files locally so that the user could rely on different comment files for different situations.

It should be appreciated that the storage and retrieval of information to and from a data structure such as comment data structure 42 is well within the capabilities of one of ordinary skill in the art. Moreover, various file formats may be utilized to exchange information in a comment data structure consistent with the invention. It should furthermore be appreciated that a complementary "export" function may also be supported so that a given user may save a comment file for use by other users.

As an additional matter, it should be appreciated that merging comment data from a given comment file into the comment data structure for a particular user may be performed in several alternate manners. For example, a comment file may simply replace all of the data in a comment data structure, essentially deleting any preexisting comments. In the alternative, a comment file may append additional comments into the comment data structure, either overwriting or supplementing any conflicting comments. In general, it should be appreciated that any functionality suitable for retrieving comment data into and storing comment data from, comment data structure 42 in a persistent representation thereof, may be used.

Another event that may be handled by routine 100 is that of adding an additional comment to the comment list for a given URL, which is detected at block 112 and handled by an add comment routine 128. Initiation of such an event may be performed, for example, in response to user control of a menu selection on a menu bar or pop-up menu for the browser, among other manners. For example, one particular suitable manner for initiating such an event would be to permit a user to open a pop-up menu while the pointer is disposed over a given hypertext link, and then permit a user to select an "add comment" selection on the pop-up menu so that a comment may be quickly created for the hypertext document referenced by that hypertext link. Other manners of initiating the addition of a comment may be utilized in the alternative.

Yet another event that may be handled by routine 100 is that of editing a URL's comment list, which is detected at block 114 and handled by an update URL comment list routine 130. As will be discussed in greater detail below, it may be desirable in certain instances to open an additional window displaying each comment associated with a given URL, to permit the comment list to be edited by a user. This event may be initiated, for example, in response to selection of a menu bar selection in the browser window, among other alternatives.

Yet another event that may be handled by routine 100 is that of detecting a right-click operation performed on a given hypertext link, which is detected at block 116. Upon detection of such an event, control may be passed to block 132 to open a URL pop-up menu. As will be discussed in greater detail below, block 132 typically operates by creating (instantiating) a new pop-up menu component (component 43 of FIG. 2), which opens a pop-up menu display representation on the display. It should be appreciated that the general operation that occurs in response to creation of a new pop-up menu is well known in the art.

FIG. 6 illustrates display pop-up routine 120 in greater detail. Routine 120 begins in block 134 by closing any pop-up window, so that only one pop-up window is visible at a time. Routine 120 is initiated in response to a pointer moving onto, or off of, a link. Routine 120 also is configured to display either a comment for the current document or a link therein, but not both. Modifications sufficient to support the concurrent display of multiple comments are within the abilities of one of ordinary skill in the art.

Next, in block 136, it is determined whether a URL is highlighted or selected, e.g., if a pointer is disposed over the display representation of a particular hypertext link, or if a particular hypertext link has been selected by the user. If not, control passes to block 138 to set the target URL pointer to point to the comment list for the URL for the currently displayed hypertext document, if such a comment list exists in the comment data structure. Typically, block 138 must search through comment data structure 42 to locate the URL of the current document. If a comment list is found, the target URL pointer is set to point to that comment list. If, on the other hand, no such comment list in the comment data structure, the target URL pointer is not reset. In the alternative, it may be appreciated that the target URL may be set to a "null" value and routine 120 prematurely terminated if no comments exist for the current hypertext document.

Returning to block 136, if a link is highlighted or selected, control instead passes to block 140 to set the target URL to the URL of the highlighted or selected link if a comment list exists therefor in the comment data structure. As with block 138, it may be desirable to prematurely terminate routine 120 if no such comment list exists such that no pop-up window is displayed for any hypertext link not having any comments associated therewith.

Upon completion of either of blocks 138 or 140, control then passes to block 142 to set the target comment pointer to point to the primary comment for the selected URL. Typically, the primary comment is the first comment in the list, and may be created, for example, as the default comment to be displayed for a given comment list. In the alternative, it may be desirable to store for each comment list a pointer to a "current" comment for the comment list, such that subsequent activations of a particular comment list will initially display the last comment that was previously displayed.

Next, in block 144, a pop-up window is displayed, including the comment specified by the target comment and target URL pointers. Typically, for a comment that is associated with a hypertext link, the pop-up window will be anchored proximate the display representation of the hypertext link (i.e., as with comment pop-up window 92). For a comment associated with the currently-displayed hypertext document, typically the pop-up window will be displayed at a fixed location on the display (e.g., as illustrated by pop-up window 84 of FIG. 4). Moreover, it should be appreciated that various information from the comment, including the comment text and/or the originator may be displayed in the pop-up window, e.g., in response to various configuration settings set by a user. For comment text in HTML-format, for example, a HTML engine may be used to render the text in the window. Other information may also be displayed, e.g., the URL associated with the link, the number of comments, the priority of the current comment (e.g., "comment x of y"), etc.

Upon completion of block 144, routine 120 is complete.

FIG. 7 illustrates next comment routine 122 in greater detail. Routine 122 begins in block 146 by determining whether a pop-up window is currently open. If not, routine 122 terminates, as there is no active comment list for which a next comment can be selected. If, however, a pop-up window is open, block 146 passes control to block 148 to adjust the target comment pointer to point to the next comment in the comment list for the target URL. Moreover, if the previously displayed comment was the last comment in the comment list, the target comment pointer may not be updated, or alternatively, the target comment pointer may be set back to the primary comment for the comment list.

Next, block 150 updates the pop-up window to display the new target comment. Routine 122 is then complete. It should be appreciated that a routine to select a previous comment would operate in much the same manner as routine 122.

FIG. 8 illustrates display originator routine 124 in greater detail. Routine 124 begins in block 152 by determining whether a pop-up window is open. If not, routine 124 terminates. If, a pop-up window is open, however, control is passed to block 154 to update the pop-up window to display the originator of the target comment. Routine 124 is then complete.

It should be appreciated, for example, that it may be desirable to set a global setting for whether or not originator information is displayed for comments, whereby anytime a comment is displayed in a pop-up window, the configuration setting would be queried to determine whether or not the originator should be displayed at that time. It should also be appreciated that an additional routine, similar to routine 124, may be utilized to hide an originator in response to further user input.

Figure 9:
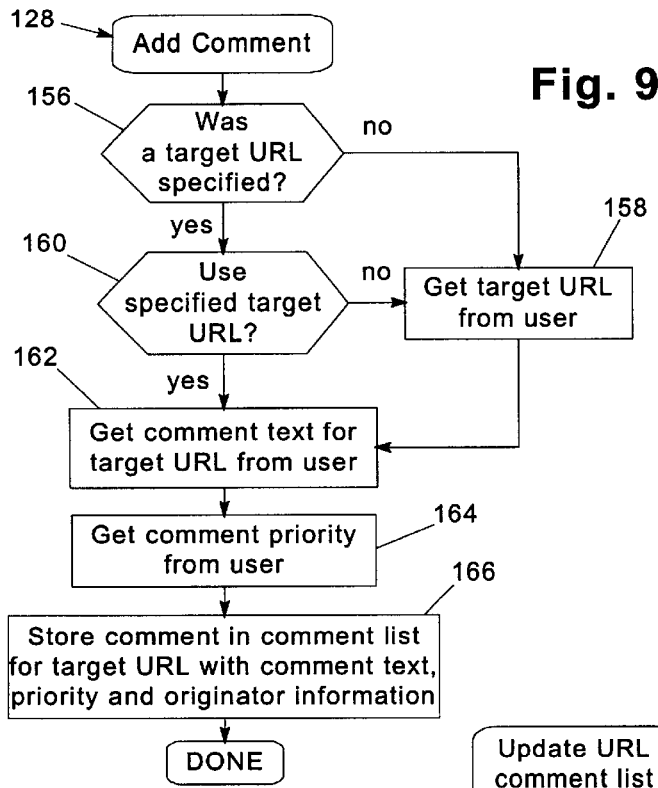
FIG. 9 is a flowchart illustrating the program flow of the add comment routine of FIG. 5.

FIG. 9 illustrates add comment routine 128 in greater detail. Routine 128 begins in block 156 by determining whether a target URL was specified in the event. A URL may be specified if the circumstances of invoking the event were such that it was clear that a user was intending to add a comment for a particular URL. For example, if a user selects a "add comment" selection on a pop-up menu associated with a given hypertext link, or if the user selects a "add comment for this URL" selection from a menu bar while a given hypertext document is displayed in the browser window, it may not be necessary to query the user to input the URL for a new comment. If, however, the event is invoked in response to a user input request to add a comment to an unspecified URL, then it will be necessary to receive additional user input specifying the particular URL for which a new comment is to be associated.

As a result, if no target URL is specified in block 156, control passes to block 158 to retrieve target URL from the user. This may be performed, for example, via a dialog box that is presented to a user in response to an invocation of the event, or in other manners known in the art.

Returning to block 156, if a target URL is specified, control passes to block 160 to determine whether or not the specified URL should be used. For example, a user might depress a SHIFT or CONTROL key while invoking the add comment event over a particular link to a specific URL to indicate that a comment should not be associated with the specific URL specified in the event. As a result, if the target URL specified with the event should not be used, control passes to block 158 to retrieve such information from the user.

If the specified target URL is to be used, or once a target URL has been received from the user, control next passes to block 162 to retrieve the comment text for the target URL from the user. This may be performed, for example, by presenting the user with a dialog box asking the user to input text or additional data for the comment. Any known editing functions, including retrieval of information from external sources, may be used to generate the comment.

Once the comment text for the target URL is received, control passes to block 164 to retrieve a comment priority from the user. For example, this may be performed by presenting the user with a dialog box that permits the new comment to be added at various locations in the comment list. This permits the user to control the order in which comments are presented as the user toggles between the various comments.

Next, in block 166, a new comment is created and added to the comment list for the target URL using the text and priority information retrieved from the user, as well as an identifier for the user that functions as the originator information for the comment. Routine 128 is then complete.

It should be appreciated that retrieval of the additional information for the comment may be performed in successive dialog boxes presented to a user, or alternatively, may be presented in an integrated dialog box which permits a user, in a single step, to input all the information necessary for creating a new comment.

Figure 10:
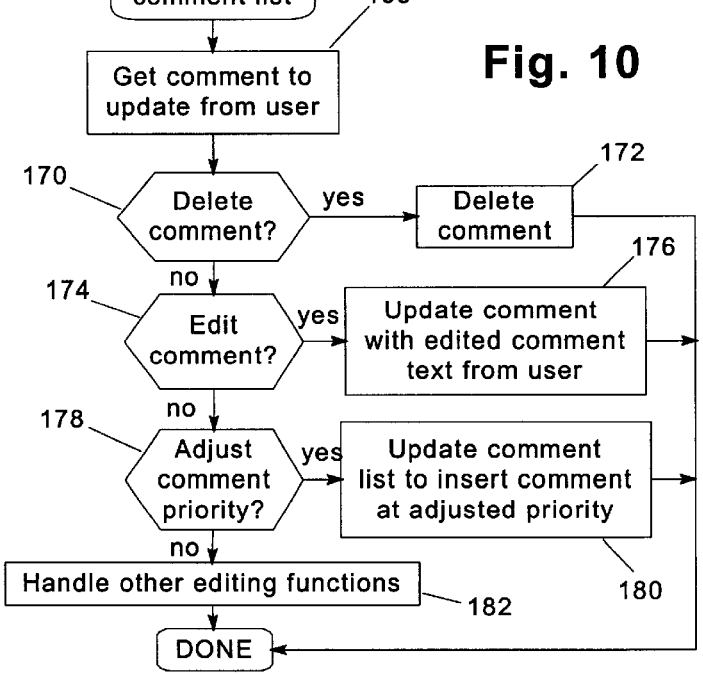
FIG. 10 is a flowchart illustrating the program flow of the update URL comment list routine of FIG. 5.

Update URL comment list routine 130 is illustrated in greater detail in FIG. 10. Routine 130 represents, for example, multiple events that a user may initiate to perform various editing functions on the comment data structure. It should be appreciated that any known editing functions may be utilized consistent with the invention, including that of deleting or editing various comments or the information contained therein, as well as adjusting the priority of various comments within a given comment list. Routine 130 therefore begins in block 168 by retrieving the comment to update from the user. It should be appreciated that this information may be supplied in the event in response to user input that is directed to a particular comment. For example, if a user selects a "delete", "edit", or "adjust priority" pop-up menu selection for a particular hypertext link (e.g., while the pointer is disposed over a particular hypertext link), the user may not need to supply additional information to select a particular comment. In the alternative, if no comment is specified in the event, the user may be queried, e.g., via a dialog box, to select a given comment for performing an editing function.

Next, in block 170, a delete comment event is detected and handled in block 172 to remove the comment from the comment list. An edit comment event is detected in block 174 and handled in block 176 by updating the comment with any edited comment text received from the user. An adjust priority event is detected in block 178 and handled in block 180 by updating the comment list to insert the comment at its new priority. Other editing functions, which will be apparent to one of ordinary skill in the art, are handled in block 182 in a conventional manner. Routine 130 is then complete. It should be appreciated that the aforementioned editing functions may be accomplished in the link list data structure in a conventional manner.

It should be appreciated that updating the priority and/or comment text for a given comment may be performed, for example, by opening a dialog box presenting such information to the user. Then, once the dialog box is closed by the user in such a manner that the changes are confirmed by the user (e.g., by depressing a "OK" button), the respective block 176, 178 will update the comment data structure based upon the data returned by the dialog box. The priority may also be updated, for example, by clicking on a comment and dragging and dropping the comment into a graphical view of a list, among other operations.

FIG. 11 illustrates the constructor routine 184 for a link pop-up menu. As discussed above, a link pop-up menu is generally opened in response to a user depressing the right mouse button while a mouse pointer is disposed over a display representation of a hypertext link. Routine 184 is executed upon creation of a new pop-up menu component, in a manner well known in the art. The routine generally begins in block 186 by building the menu selections, which may include various selections conventional in the browser art, such as "open link", "open link in new window", "save target as . . . ", "add to favorites . . . ", and "properties", among others.

Next, in block 188, it is determined whether the URL specified in the hypertext link has a comment list associated therewith in the comment data structure. If so, control passes to block 190 to insert additional selections into the pop-up menu to permit a user to access and/or manipulate comments in the manners described herein. For example, various selections such as "add comment", "next comment", "delete comment", "display originator", etc. may be added to the menu and handled in the manner described above. At the minimum, it is desirable to insert a "comment . . . " selection that a user may select to open a comment window that displays each of the comments associated with a particular URL (discussed in greater detail below).

Once all of the selections have been added to the pop-up menu, block 190 passes control to block 192 to display the pop-up menu on the computer display, in a manner well known in the art. Returning to block 188, if no comment list exists for the click-on URL, control passes directly to block 192.

Once the pop-up menu is displayed, an event handling loop similar to main browser routine 100 is initiated in block 194 to handle various events directed to the pop-up menu. One such event which is relevant to the invention is selection of the "comment . . . " selection in the pop-up menu, which is detected at block 196, and is handled in block 198 by opening a comment window for the given URL. Block 198 typically operates by creating a new comment window component (e.g., comment window component 44 of FIG. 2). Once this window is opened, routine 184 may then be terminated, and the pop-up menu removed from the display. Returning to block 196, if an event received in block 194 is not that for opening the comment window, control passes to block 200 to handle other menu-related events, in a manner well known in the art. For example, one such event may be handling any of the other menu selections on the pop-up menu. Also, another event may be that of closing the pop-up menu, whereby routine 184 would be terminated thereby.

In another embodiment, it may be desirable to display comment text as a selection in a pop-up menu, typically truncated pursuant to space requirements, with the full text displayed if the pointer is moved over the selection or the mouse button is clicked when the pointer is over the selection. Other functions, e.g., selecting links embedded in the comment, or editing the comment, may also be supported from this selection.

FIG. 12 illustrates a constructor routine 202 for a comment window created as described above with reference to FIG. 11. Routine 202 begins in block 204 by displaying the full text for each comment in the selected comment list within a new window in the computer display. Next, a loop is initiated in block 206 to handle various events directed to the window. For example, one event that may be detected by the comment window is that of adding a new comment, which may be detected at block 208 and handled by an add comment routine 210 which operates in substantially the same manner as routine 128 of FIG. 9. Another event that may be handled by the comment window is that of editing any comment in the comment list, an event that is detected at block 212 and handled by an update URL comment list routine 214 (which may operate, for example, in substantially the same manner as routine 130 of FIG. 10).

Yet another event that may be handled is that of selection of a hypertext link in any of the comment text for a comment in the comment list displayed in the comment window. This event is detected, for example, in block 216 and handled in block 218 by passing an event to the browser to navigate to the selected URL, an operation which is well known in the art. With this latter event, a user is permitted to navigate to specific documents specified in a comment. The navigation may occur in the main browser window, or may result in a new window being opened to display the new document. It should be appreciated that other executable-type code may be embedded in a comment to permit other operations to occur as a result of user manipulation of comment text.

Block 220 handles other events directed to the comment window in a manner well known in the art. For example, operations such as resizing, moving, or closing the window may be handled in a conventional manner in block 220. A close event would result in termination of routine 202 and removal of the comment window from the display.

Figure 13:
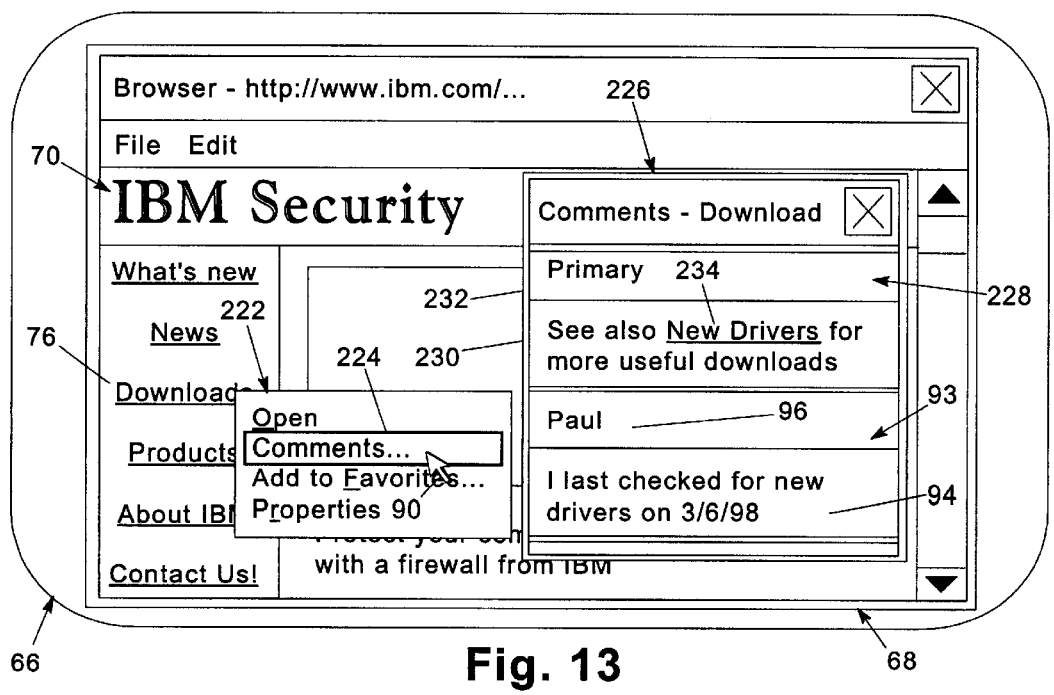
FIG. 13 is a block diagram of the computer display of FIG. 4, illustrating display representations of a pop-up menu and a comment window consistent with the invention.

FIG. 13 illustrates exemplary display representations of a pop-up menu and a comment window that may be generated in response to the execution of routines 184 and 202 of FIGS. 11 and 12, respectively. For example, in response to a user right-clicking on the display representation of hypertext link 76 in hypertext document 70, a display representation of a pop-up menu 222 may be opened, including in addition to the conventional menu selections such as "open", "add to favorites" and "properties", a menu selection 224 entitled "comments . . . " that is illustrated as being selected by a user with pointer 90. In response to selection of this menu selection, a display representation of a comment window 226 is opened to display the comment list for the URL specified by hypertext link 76. Two comments are illustrated in the comment list, including the aforementioned comment 93 that was displayed in pop-up window 92 of FIG. 4, and an additional comment 228, including comment text 230 and originator data 232. As is also illustrated in FIG. 13, comment text 230 of comment 228 includes a hypertext link 234 that specifies an additional hypertext document that can be navigated to via user selection of the link. Consequently, should a user direct pointer 90 over the display representation of hypertext link 234, the browser would be directed to open the hypertext document specified by that link.

In addition to permitting a user to create comments and permitting a user to import additional comments into a comment data structure, it may also be desirable for an author of a particular hypertext document to provide comments for use by viewers of the document. One suitable manner of supporting this function would be to implement a unique hypertext tag format from which comment data pertaining to one or more comments for a given document may be inserted into a comment data structure for a user. For example, one suitable HTML-type tag that may be used to embed comment data into a hypertext document is illustrated below:

<comment N> . . . [comment text] . . . </comment N>, where N is an integer number representing the priority of the comment and its relative placement in the comment data structure. In other embodiments, the priority may also be omitted, whereby the relative ordering of comments may be based upon the order in which the tags appear in the hypertext document.

The originator may be set to default to "primary" or "author of document", or may be explicitly identified by an originator tag embedded between the "<comment N>" and "</comment N>", e.g., having a format such as:

<comment originator> . . . [name of originator] . . . </comment originator>.

It may also be desirable to support comments about a particular hypertext link embedded in a hypertext document so that the user is provided with additional comments pertaining to a document referenced by that link. For example, an HTML-compatible hypertext link definition typically has a format such as:

<A HREF="[URL for link]"> . . . [displayed text for link] . . . </A>.

By placing comment tags between the "<A>" and "</A>" tags for a hypertext link definition, the comment tags can be associated with the particular URL specified in the definition. Also, it should be appreciated that originator tags may also be embedded within comment tags associated with particular hypertext link definitions.

Figure 14:
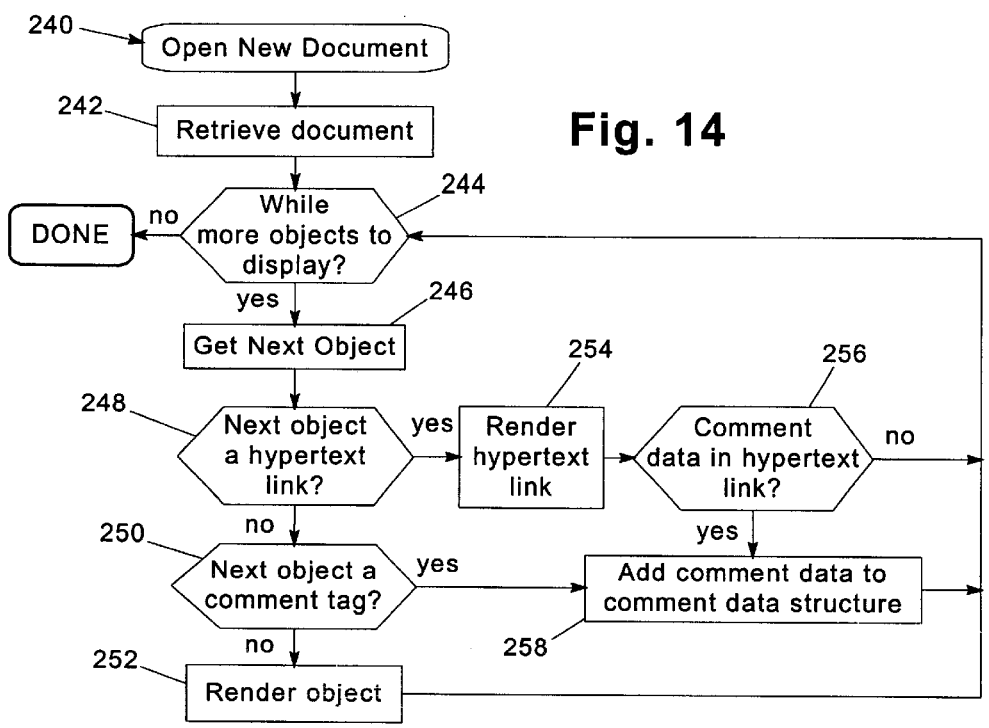
FIG. 14 is a flowchart illustrating the program flow of an open new document routine for the browser of FIG. 2.

To process the additional tags for the purpose of adding comments to a comment data structure, it may be desirable to use a conventional HTML rendering algorithm with additional support provided for the unique tags directed to embedded comment data. One suitable HTML rendering routine is illustrated as open new document routine 240 of FIG. 14. Routine 240 is typically called in response to a request by a user to navigate to a new document located at a particular URL. Routine 240 begins in block 242 by retrieving the hypertext document specified by the URL passed to the routine. Next, block 244 initiates a WHILE loop to process each "object" in the document, a process which is generally well known in the browser art. For each such object, control passes to block 246 to get the next object from the document, and control then passes to block 248 to render the object for display on a computer display. How the object is rendered depends upon the type of object. Blocks 248 and 250 detect two such objects that require special processing to handle any embedded comment data in the hypertext document. For other types of objects, such objects may be rendered in a conventional manner, as represented at block 252.

Block 248 detects an object as being a hypertext link definition. If the currently-processed object is a hypertext link definition, control passes to block 254 to render the hypertext link definition in a conventional manner to generate a display representation thereof on the computer display. Next, block 256 determines whether comment data is included in the hypertext link definition—that is, whether a "<comment N>" tag is embedded within the hypertext tags therefor. If not, control returns to block 244, and no additional processing is required. If, however, a comment tag is embedded within the tags defining the hypertext link definition, control passes to block 258 to add such data to the comment data structure—that is, to create a new comment and add it to the comment list for the URL specified by the hypertext link definition. Control then returns to block 244 to process additional objects.

Another specially-handled object is a comment tag for the document being rendered, which is detected at block 250 and handled by block 258. Block 258 in this context adds the comment data specified in the comment tag to the comment data structure as with any comment data specified in a hypertext link definition. However, rather than adding the comment data to the comment list for a particular URL specified by an associated definition, any comment added in this context is associated with the comment list for the URL for the current hypertext document.

It should be appreciated that a user may be permitted to turn on or off the addition of new comments from embedded tags as desired. For example, a user may not wish to clutter up their comments with author-generated comments that may be unhelpful.

A number of advantages may be realized through the use of comments in the manner described herein. For example, comments can be obtained from a variety of sources, including those independent of a document, e.g., a local user or others, and comments may be swapped and shared by users. Also, a user typically is permitted to view comments about documents prior to retrieving those documents in many circumstances, thereby often saving needless viewing of undesirable documents.

Various modifications may be made to the embodiments described herein without departing from the spirit and scope of the invention. Therefore, the invention lies in the claims hereinafter appended.

What is claimed is:

1. A method of displaying a hypertext document, the method comprising:
    (a) displaying at least a portion of a hypertext document on a computer display;
    (b) accessing a comment data structure including a plurality of comments to locate a predetermined comment among the plurality of comments that is associated with the hypertext document;
    (c) displaying a display representation of the predetermined comment on the computer display; and
    (d) adding a new comment to the comment data structure by building the comment from information in a comment data tag embedded in the hypertext document.

2. The method of claim 1, wherein each of the plurality of comments includes a storage location identifier associated with a predetermined storage location.

3. The method of claim 2, wherein the hypertext document is associated with a predetermined storage location, and wherein accessing the comment data structure determines that the predetermined comment is associated with the hypertext document if the storage location identifier for the predetermined comment identifies the predetermined storage location of the hypertext document.

4. The method of claim 2, wherein the hypertext document includes a hypertext link definition associated with a predetermined storage location, and wherein accessing the comment data structure determines that the predetermined comment is associated with the hypertext document if the storage location identifier for the predetermined comment identifies the predetermined storage location of the hypertext link definition.

5. The method of claim 4, wherein displaying the portion of the hypertext document includes displaying a display representation of the hypertext link definition, and wherein displaying the display representation of the predetermined comment on the computer display is responsive to user input directed to the display representation of the hypertext link definition.

6. The method of claim 5, wherein displaying the display representation of the predetermined comment on the computer display is responsive to user movement of a pointer over the display representation of the hypertext link definition.

7. The method of claim 5, wherein displaying the display representation of the predetermined comment on the computer display includes displaying the display representation of the comment within a pop-up window disposed proximate the display representation of the hypertext link definition.

8. The method of claim 4, wherein the predetermined storage location identified by the storage location identifier for the predetermined comment includes a Uniform Resource Locator (URL).

9. The method of claim 1, further comprising adding a second new comment to the comment data structure.

10. The method of claim 9, wherein adding the second new comment to the comment data structure includes associating the second new comment with a predetermined storage location associated with the hypertext document.

11. The method of claim 9, wherein adding the second new comment to the comment data structure includes associating the second new comment with a predetermined storage location associated with a hypertext link definition in the hypertext document.

12. The method of claim 9, wherein adding the second new comment to the comment data structure is performed in response to user input, and includes receiving comment text for the second new comment from a user.

13. The method of claim 9, wherein adding the second new comment to the comment data structure includes retrieving the second new comment from a comment file, the comment file including a persistent representation of a plurality of comments.

14. The method of claim 13, wherein the data structure is associated with a first user, and wherein the comment file is created by a second user.

15. The method of claim 9, wherein building the comment is performed in response to retrieval of the hypertext document.

16. The method of claim 1, wherein the comment data structure is stored in a first computer local to a user, the method further comprising retrieving the hypertext document from a second computer remote from the user.

17. The method of claim 16, wherein the comment data structure is persistently stored in the first computer during a first communication session such that the comment data structure is available for a subsequent retrieval of the hypertext document during a second communication session.

18. The method of claim 1, wherein the predetermined comment includes an originator identifier that identifies an originator of the predetermined comment.

19. The method of claim 1, wherein the predetermined comment includes a hypertext link definition associated with a predetermined storage location, the method further comprising:
   (a) displaying a display representation of the hypertext link definition; and
   (b) retrieving a second hypertext document associated with the predetermined storage location in response to user input directed to the display representation of the hypertext link definition.

20. The method of claim 1, wherein the comment data structure includes a second predetermined comment among the plurality of comments that is associated with the hypertext document.

21. The method of claim 20, wherein displaying the display representation of the predetermined comment includes selectively displaying a display representation of one of the first and second predetermined comments in response to user input.

22. The method of claim 20, further comprising concurrently displaying display representations of the first and second predetermined comments.

23. An apparatus, comprising:
   (a) a memory;
   (b) a comment data structure resident in the memory, the comment data structure including a plurality of comments; and
   (c) a program resident in the memory, the program configured to locate a predetermined comment in the comment data structure that is associated with a hypertext document, and to concurrently display to a user at least a portion of the hypertext document and a display representation of the predetermined comment, the program further configured to add a new comment to the comment data structure by building the comment from information in a comment data tag embedded in the hypertext document.

24. The apparatus of claim 23, wherein each of the plurality of comments includes a storage location identifier, wherein the hypertext document is associated with a predetermined storage location, and wherein the program determines that the predetermined comment is associated with the hypertext document if the storage location identifier for the predetermined comment identifies the predetermined storage location of the hypertext document.

25. The apparatus of claim 23, wherein each of the plurality of comments includes a storage location identifier, wherein the hypertext document includes a hypertext link definition associated with a predetermined storage location, and the program determines that the predetermined comment is associated with the hypertext document if the storage location identifier for the predetermined comment identifies the predetermined storage location of the hypertext link definition.

26. The apparatus of claim 25, wherein the program is configured to display the display representation of the predetermined comment in response to user movement of a pointer over a display representation of the hypertext link definition displayed on the computer display.

27. The apparatus of claim 23, wherein the program is further configured to add a second new comment to the comment data structure, with the second new comment associated with a predetermined storage location for one of the hypertext document and a hypertext link definition in the hypertext document.

28. The apparatus of claim 23, wherein the program is further configured to add a second new comment to the comment data structure in response to user input, with the second new comment including comment text input by a user.

29. The apparatus of claim 23, wherein the program is further configured to add a second new comment to the comment data structure by retrieving the second new comment from a comment file including a persistent representation of a second plurality of comments.

30. The apparatus of claim 23, wherein the program is further configured to build the new comment in response to retrieval of the hypertext document.

31. The apparatus of claim 23, wherein the comment data structure is persistently stored in the apparatus, and wherein the program is configured to retrieve the hypertext document from a source remote to the apparatus.

32. The apparatus of claim 23, wherein the predetermined comment includes a hypertext link definition associated with a predetermined storage location, and wherein the program is further configured to retrieve a second hypertext document associated with the predetermined storage location in response to user input directed to a display representation of the hypertext link definition.

33. The apparatus of claim 23, wherein the comment data structure includes a second predetermined comment among the plurality of comments that is associated with the hypertext document, and wherein the program is further configured to selectively display a display representation of one of the first and second predetermined comments in response to user input.

34. The apparatus of claim 23, wherein the comment data structure includes a second predetermined comment among the plurality of comments that is associated with the hypertext document, and wherein the program is further configured to concurrently display display representations of the first and second predetermined comments.

35. A program product, comprising:
   (a) a program configured to access a comment data structure including a plurality of comments to locate a predetermined comment in the comment data structure that is associated with a hypertext document, the program further configured to concurrently display to a user at least a portion of the hypertext document and a display representation of the predetermined comment, the program further configured to add a new comment to the comment data structure by building the comment from information in a comment data tag embedded in the hypertext document; and (b) a signal bearing media bearing the program.

36. The program product of claim 35, wherein the signal bearing media is transmission type media.

37. The program product of claim 35, wherein the signal bearing media is recordable media.

38. A method of accessing hypertext documents stored on a remote computer for display on a local computer, the method comprising:

(a) maintaining in a local computer a comment data structure, the comment data structure including a plurality of comments, each associated with a Uniform Resource Locator (URL);

(b) retrieving a first hypertext document from a remote computer and into the local computer, the first hypertext document including a hypertext link definition that identifies a URL for a second hypertext document;

(c) displaying the first hypertext document on a computer display for the local computer, including displaying a display representation of the hypertext link definition;

(d) in response to user input directed to the hypertext link definition, accessing the comment data structure to locate a predetermined comment among the plurality of comments that is associated with the URL for the second hypertext document;

(e) displaying a display representation of the predetermined comment on the computer display; and (f) adding a new comment to the comment data structure by building the comment from information in a comment data tag embedded in the hypertext document.

39. A method of building a data structure, the data structure including a plurality of comments, each of which is associated with a predetermined storage location, the method comprising:

(a) retrieving a hypertext document; and (b) in response to retrieval of a comment data tag embedded in the hypertext document, adding a comment to the data structure using information in the comment data tag.

40. The method of claim 1, wherein adding the new comment includes associating the new comment with a second hypertext document referenced by the first hypertext document.

41. The apparatus of claim 23, wherein the program is configured to add the new comment further by associating the new comment with a second hypertext document referenced by the first hypertext document.

* * * * *